United States Patent Office 2,723,915
Patented Nov. 15, 1955

2,723,915

MONOCRYSTALLINE REFRACTIVE COMPOSITION AND ITS METHOD OF PREPARATION

Leon Merker, New York, N. Y., assignor to National Lead Company, New York, N. Y., a corporation of New Jersey No Drawing. Application February 2, 1953,
Serial No. 334,708

9 Claims. (Cl. 106—42)

This invention relates to monocrystalline strontium titanate and to methods of making and treating monocrystalline strontium titanate.

Monocrystalline strontium titanate is characterized by a high index of refraction (about 2.4) and a low reciprocal relative dispersion or $\mu$ value (about 13). Large single crystals of strontium titanate may be made which are clear, transparent and glass-like and such crystals have important optical applications because the index of refraction is substantially higher and the reciprocal relative dispersion substantially lower than those of the densest flint glasses. Whether clear or colored, the crystals have important gem stone and other applications because of their high refraction and dispersion.

One broad use of optical materials having high refractive indices and high dispersion is in the manufacture of lenses and prisms. For example, materials having a high index of refraction are utilized in the construction of optical systems such as telescopic or high magnification microscopic objectives. Furthermore combinations of optical materials which individually possess widely variant optical properties are used to prepare achromatic lenses. High dispersion qualities are also useful for making prisms and the like. Highly refractive single crystal material is also useful for the preparation of ornamental objects such as gem stones. Synthetic gems of various types and colors are in great demand for both personal adornment and industrial uses.

An object of this invention therefore is to provide colored crystalline material which possesses exceedingly high index of refraction with a high dispersion or relatively low $\mu$ value. A further object is to provide a method for producing glass-like composition suitable for manufacture of gem stones and the like. Another object is to provide a process for the manufacture of colored monocrystalline glass-like material which is economical and simple to operate. These and other objects will become apparent from the following more complete description of the invention.

Broadly this invention contemplates a monocrystalline mass of colored strontium titanate and a method for producing the same which comprises periodically introducing into an oxygen-hydrogen flame a powdered composition consisting essentially of strontium titanate and an effective amount up to about 3.0% of a compound selected from the group consisting of oxidic compound of iron, oxidic compound of vanadium, oxidic compound of chromium, oxidic compound of manganese, oxidic compound of nickel, oxidic compound of cobalt, and crystallizing the melted material as a monocrystalline mass in the form of a boule and subsequently subjecting the boule to an oxidizing treatment at temperature from about 650° C. to about 1700° C. to produce the desired color. It has been found that amounts of addition agents as low as about 0.005% are effective in changing the color of the strontium titanate crystal when employing oxidic compounds of iron, manganese, nickel and cobalt. However, when employing oxidic compounds of chromium and vanadium amounts as low as about 0.001% are effective.

This application is a continuation-in-part of co-pending application Serial No. 252,906, filed October 24, 1951, now U. S. Patent No. 2,628,156, issued February 10, 1953, which describes and claims monocrystalline strontium titanate prepared without the addition of modifying or coloring agents. The process for preparation of the single crystals of strontium titanate is more fully described in co-pending application Serial No. 334,704, filed February 2, 1953, entitled "Refractive Material."

The term strontium titanate is intended to embrace both pure and substantially pure $SrTiO_3$, the latter which contains impurities or coloring or modifying agents either present or added which are of a nature and in amount so as to not affect the monocrystalline structure nor alter the desired color of the strontium titanate material produced. In most cases the impurities are held to a minimum and ordinarily will not exceed a few tenths of a per cent and modifying or coloring agents are added in the amount necessary to produce the desired effect.

In order to prepare a monocrystalline mass by co-fusing particles of strontium titanate, it is necessary to employ high temperatures. Strontium titanate melts in the neighborhood of about 2050° C. and it is therefore preferred to use an oxygen-hydrogen flame in order to obtain the necessary temperatures without the possible introduction of impurities.

It is convenient to drop the finely divided particles of the strontium titanate composition into the area of intense heat formed by the oxygen-hydrogen flame, i. e., in or near the oxygen cone. Within this area the strontium titanate composition melts and as it cools below the melting point crystallizes as a single crystal on a base which holds the strontium titanate material. In order to start such a single crystal to form it is desirable to first form a seed and then build up the amount of molten material on the seed to form the crystal. Such a procedure allows the crystal to build up upon itself, gradually increasing in diameter, until a boule or carrot-shaped single crystal of strontium titanate is formed. The size of the orifices of the oxygen-hydrogen torch determines the size of the intensely heated zone which, in turn, determines the diameter of the carrot-shaped crystal produced.

It is preferred to employ a strontium titanate powdered material which is substantially free from objectionable or incompatible impurities which detrimentally would affect the crystal structure. Starting material should be finely divided and fairly uniform in size. Such a material may be conveniently prepared by first reacting titanium oxalate with strontium chloride to precipitate strontium titanium oxalate. After thoroughly washing the strontium titanium oxalate, it is heated at a temperature of at least 500° C. to remove the oxalate portion thus forming strontium titanate. Preferably this strontium titanate material is then crushed and ground to obtain finely divided material from which the strontium titanate single crystal is subsequently formed.

Substantially any oxidic compound of iron, vanadium, chromium, manganese, nickel, or cobalt can be added to the feed material, for example, the oxide or any oxidic compounds which form oxides at the temperatures employed in the preparation of the strontium titanate boule. According to the present invention small amounts of these addition agents, for example, the oxides, may be mixed with the strontium titanate starting material in any convenient manner, for instance, by dry mixing. A more uniform mixture and therefore a preferred mixture may be prepared by adding compounds of the addition agent as a powder, slurry or solution to the strontium titanium oxalate prior to the heat treatment to remove the oxalate portion. The amount of addition agent to be added to the strontium titanate starting material is very small and should not exceed about 3.0% calculated as metal oxide based on the weight of the strontium titanate.

This invention covers adding small amounts, i. e. effective amounts up to about 3.0% of oxidic compounds of the elements Fe, V, Cr, Mn, Ni, and Co. The amounts of addition agents to be employed may be varied depending upon the desired final color. When employing strontium titanate containing various amounts of addition agents in the feed material according to the instant invention, the boule as produced possesses a black color. After it is subjected to an oxidizing treatment, however, the boule changes in color to produce the desired color.

After these black boules are subjected to an oxidizing treatment a whole variety of colors is obtained ranging from yellow to topaz through red to reddish black. The various depths of colors are dependent upon the amount of addition agents employed. In order to show the effects of the various amounts of addition agents upon the color of the boule produced, the following table is presented showing the various percentage ranges which produce the various colors after the oxidation treatment.

|  | 0.001% to 0.005% | 0.005% to 0.02% | ≥0.02% to 0.1% | >0.1% to 3.0% |
| --- | --- | --- | --- | --- |
| iron oxide |  | yellow to yellow-brown. | light brown to dark brown. | dark red brown to black. |
| vanadium oxide | yellow to dark red brown. | dark red brown to black. | black | black. |
| chromium oxide | ----do---- | ----do---- | ----do---- | Do. |
| manganese oxide |  | light yellow to deep yellow. | yellow orange to deep reddish orange. | deep red to reddish black. |
| nickel oxide |  | yellow to topaz | topaz to reddish topaz | Do. |
| cobalt oxide |  | ----do---- | ----do---- | Do. |

The boules described in the above table were prepared in the following manner. Feed materials consisted of a mixture of strontium titanate and various quantities of oxidic compounds of the transition elements. These feed materials were progressively fused by passing the powdered material through the flame. The fusions were carried out at temperatures between 2080° C. and 2150° C. The boule was grown on a pedestal as the fused material was progressively crystallized. As produced, the boules were substantially black in color. They were substantially carrot-shaped and had a more or less frosted outer surface. When split, the interior surface of the pieces is vitreous and shiny. These boules were subsequently subjected to an oxidizing treatment, in either whole or split form at temperatures from 650° C. to 1700° C. for 12 to 180 hours. These oxidized crystals were then cut and polished to form beautiful colored gems. The material possessed a high index of refraction with a high dispersion.

From the above description it will be seen that a colored monocrystalline composition has been prepared which possesses a high index of refraction with a high dispersion. Such composition is suitable for the manufacture of gem stones and the like. By the process of the instant invention glass-like compositions ranging in color from yellow to topaz through red to reddish black are obtained.

While this invention has been described and illustrated by the examples shown, it is not intended to be strictly limited thereto and other modifications and variations may be employed within the scope of the following claims.

I claim:

1. Highly refractive glass-like monocrystalline composition consisting essentially of strontium titanate and a compound selected from the group consisting of oxidic compound of iron, oxidic compound of vanadium, oxidic compound of chromium, oxidic compound of manganese, oxidic compound of nickel, and oxidic compound of cobalt the amount of oxidic compound employed being from about 0.005% to about 3.0%, by weight, for iron, manganese, nickel and cobalt, and being from about 0.001% to about 3.0%, by weight, for chromium and vanadium.

2. Highly refractive colored glass-like monocrystalline composition consisting essentially of strontium titanate and a compound selected from the group consisting of oxidic compound of iron, oxidic compound of vanadium, oxidic compound of chromium, oxidic compound of manganese, oxidic compound of nickel, and oxidic compound of cobalt the amount of oxidic compound employed being from about 0.005% to about 3.0%, by weight, for iron, manganese, nickel and cobalt, and being from about 0.001% to about 3.0%, by weight, for chromium and vanadium, and characterized by a color ranging from yellow to topaz through red to reddish black.

3. Composition according to claim 1 in which said compound is iron oxide.

4. Composition according to claim 1 in which said compound is chromium oxide.

5. Composition according to claim 1 in which said compound is manganese oxide.

6. Composition according to claim 1 in which said compound is nickel oxide.

7. Composition according to claim 1 in which said compound is cobalt oxide.

8. Method for the preparation of a monocrystalline mass of strontium titanate which comprises periodically introducing into an oxygen-hydrogen flame a powdered composition consisting essentially of strontium titanate and a compound selected from the group consisting of oxidic compound of iron, oxidic compound of vanadium, oxidic compound of chromium, oxidic compound of manganese, oxidic compound of nickel, and oxidic compound of cobalt the amount of oxidic compound employed being from about 0.005% to about 3.0%, by weight, for iron, manganese, nickel and cobalt, and being from about 0.001% to about 3.0%, by weight, for chromium and vanadium, and crystallizing the melted material as a monocrystalline mass in the form of a boule.

9. Method for the production of a colored monocrystalline mass of strontium titanate which comprises periodically introducing into an oxygen-hydrogen flame a powdered composition consisting essentially of strontium titanate and a compound selected from the group consisting of oxidic compound of iron, oxidic compound of vanadium, oxidic compound of chromium, oxidic compound of manganese, oxidic compound of nickel and oxidic compound of cobalt the amount of oxidic compound employed being from about 0.005% to about 3.0%, by weight, for iron, manganese, nickel and cobalt, and being from about 0.001% to about 3.0% by weight, for chromium and vanadium, crystallizing the melted material as a monocrystalline mass in the form of a boule and subsequently subjecting the boule to an oxidizing atmosphere at temperature from about 650° C. to about 1700° C. to produce the desired color ranging from yellow to topaz through red to reddish black.

References Cited in the file of this patent

UNITED STATES PATENTS

| 1,935,717 | Jaeger et al. | Nov. 21, 1933 |
| 1,952,255 | Jaeger et al. | Mar. 27, 1934 |
| 1,952,256 | Jaeger et al. | Mar. 27, 1934 |